April 17, 1928.
R. LENTZ
1,666,335
AUTOMATIC SLICING, TOASTING, AND BUTTERING MACHINE
Filed June 29, 1925
7 Sheets-Sheet 1
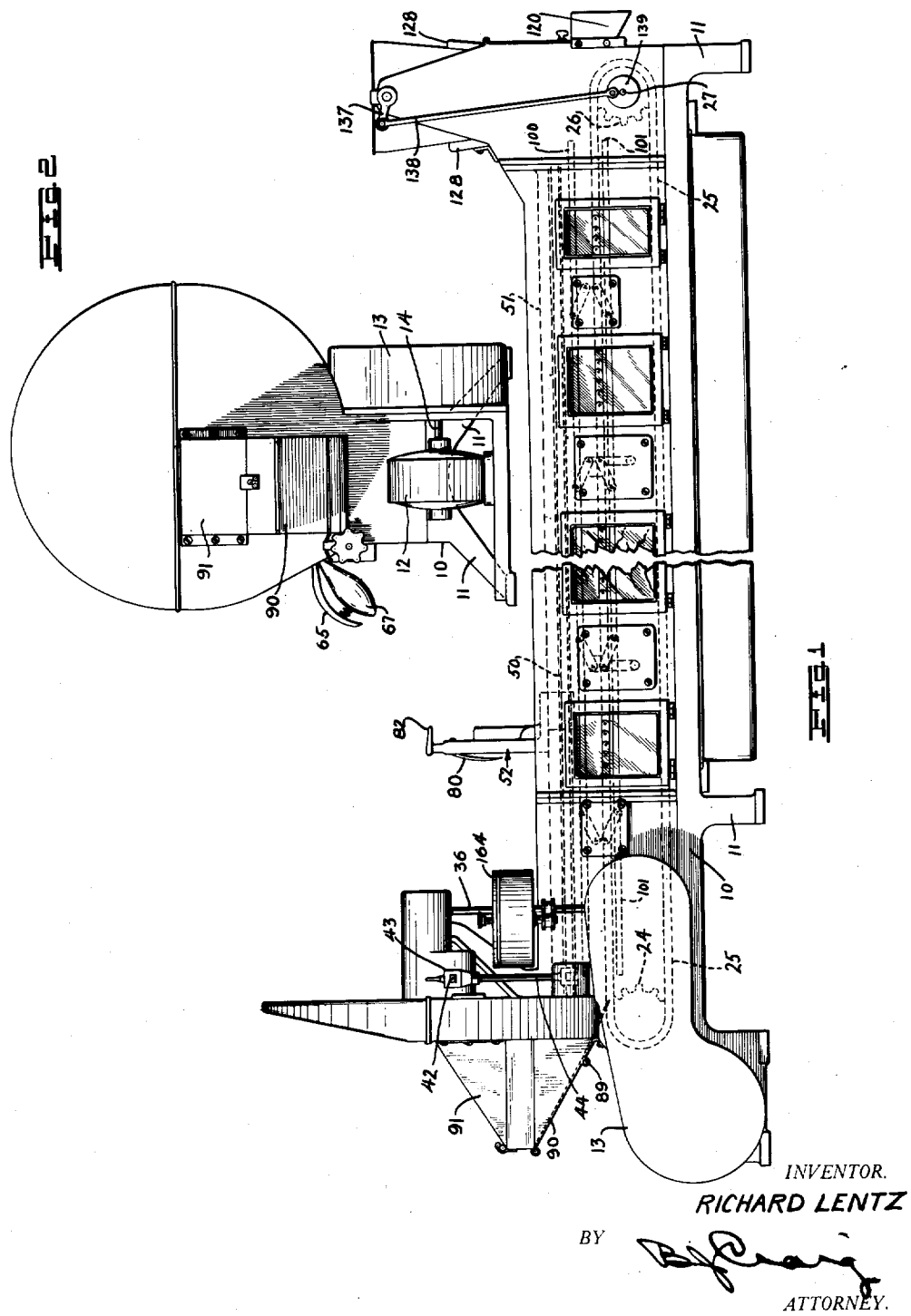
INVENTOR.
RICHARD LENTZ
BY
ATTORNEY.

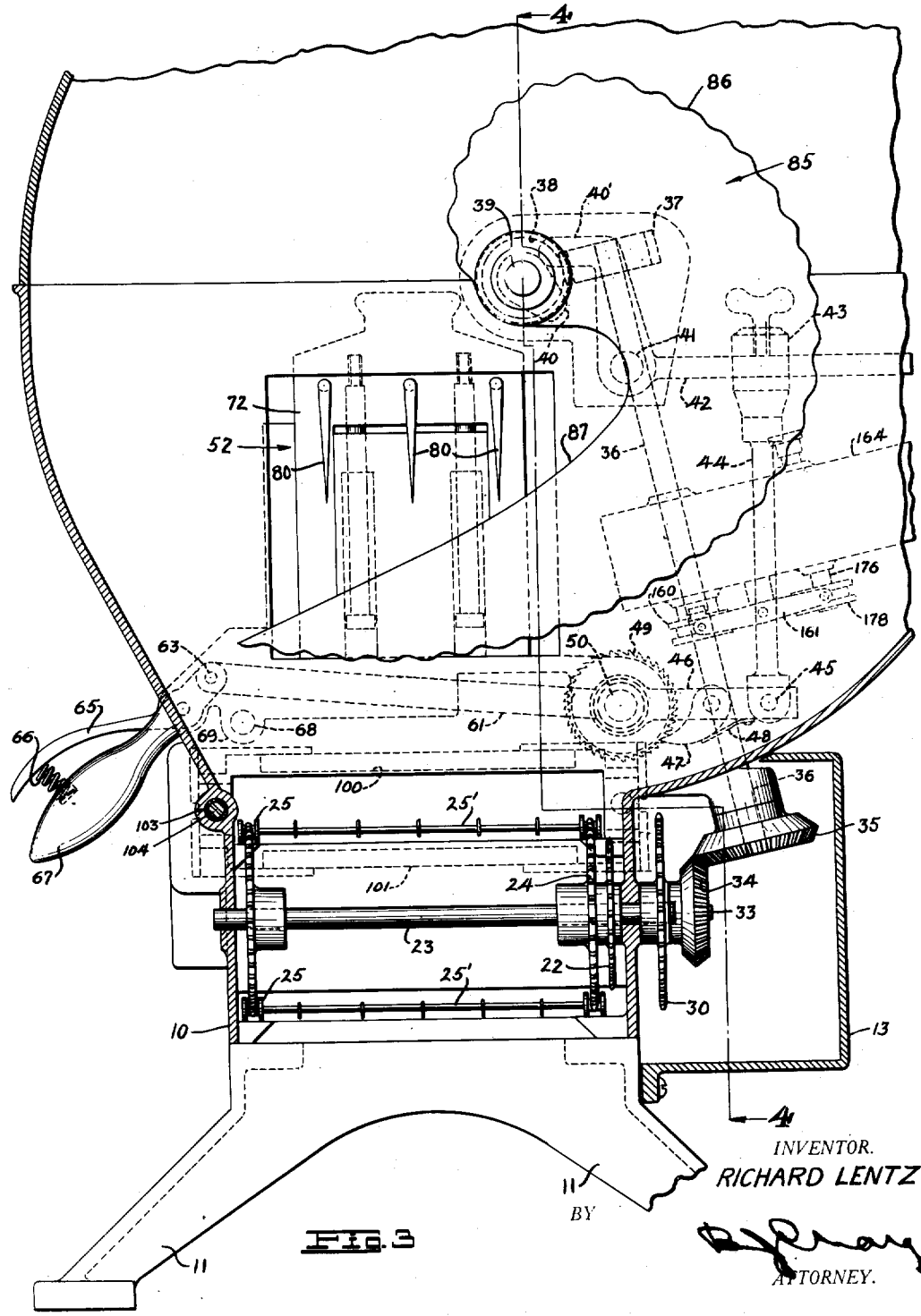

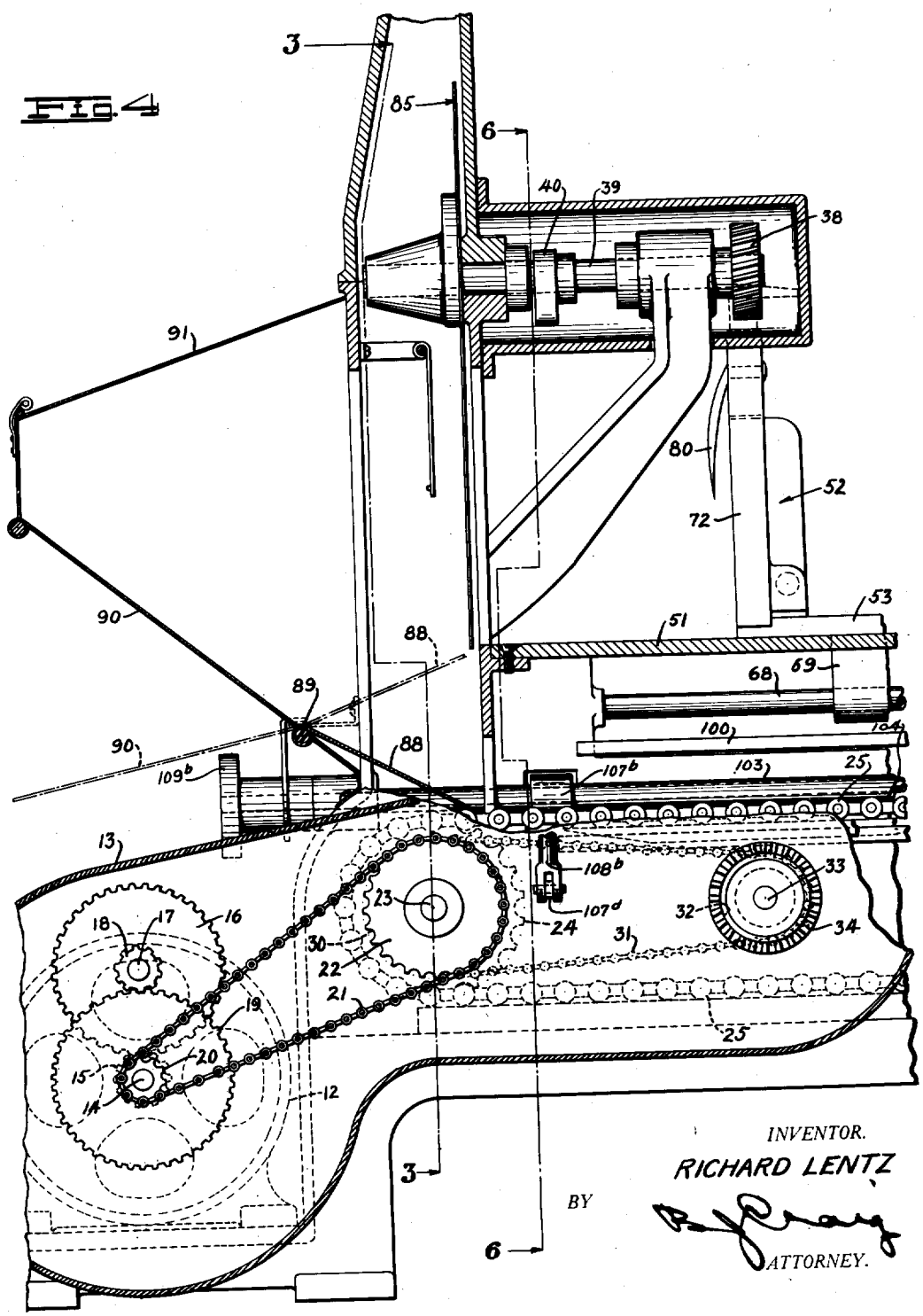

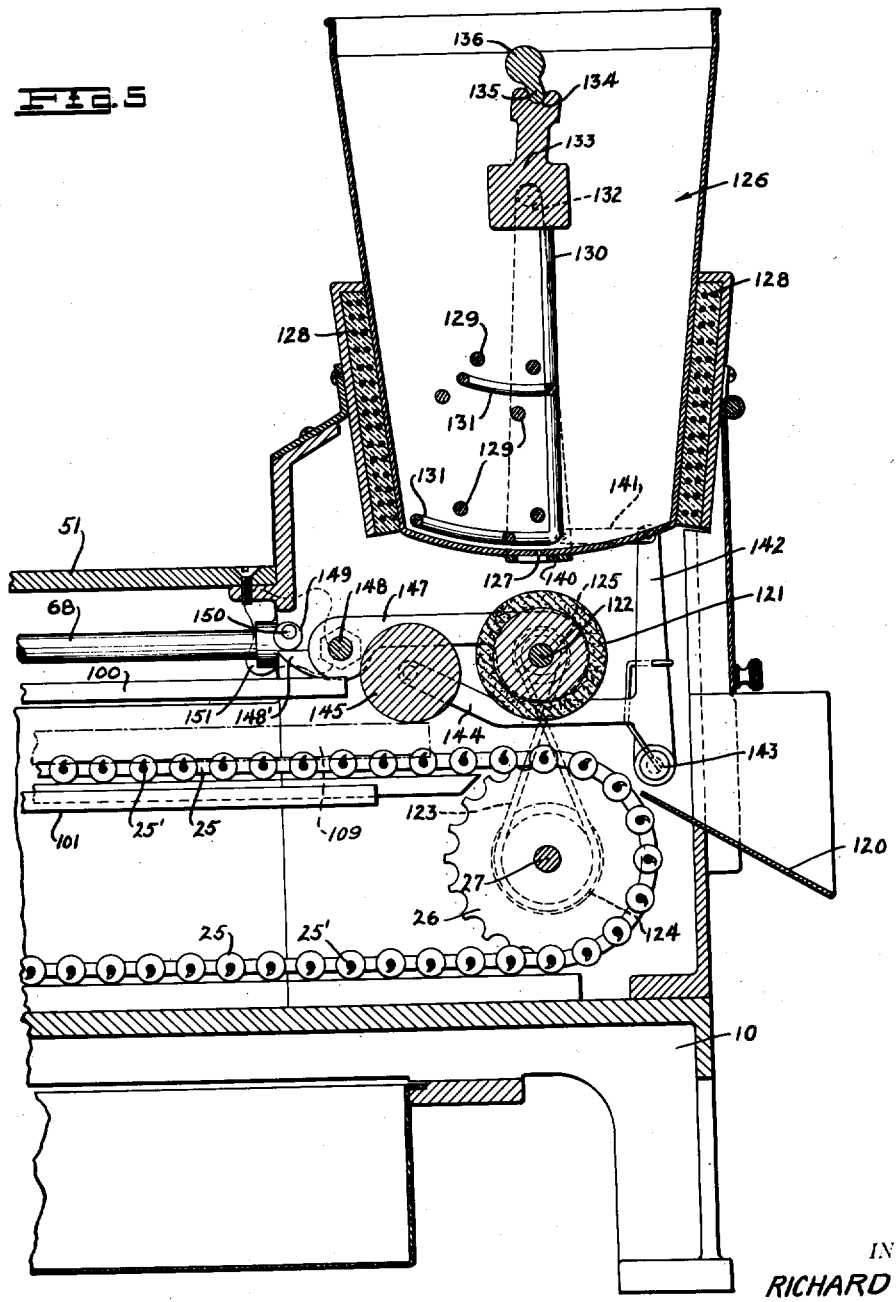

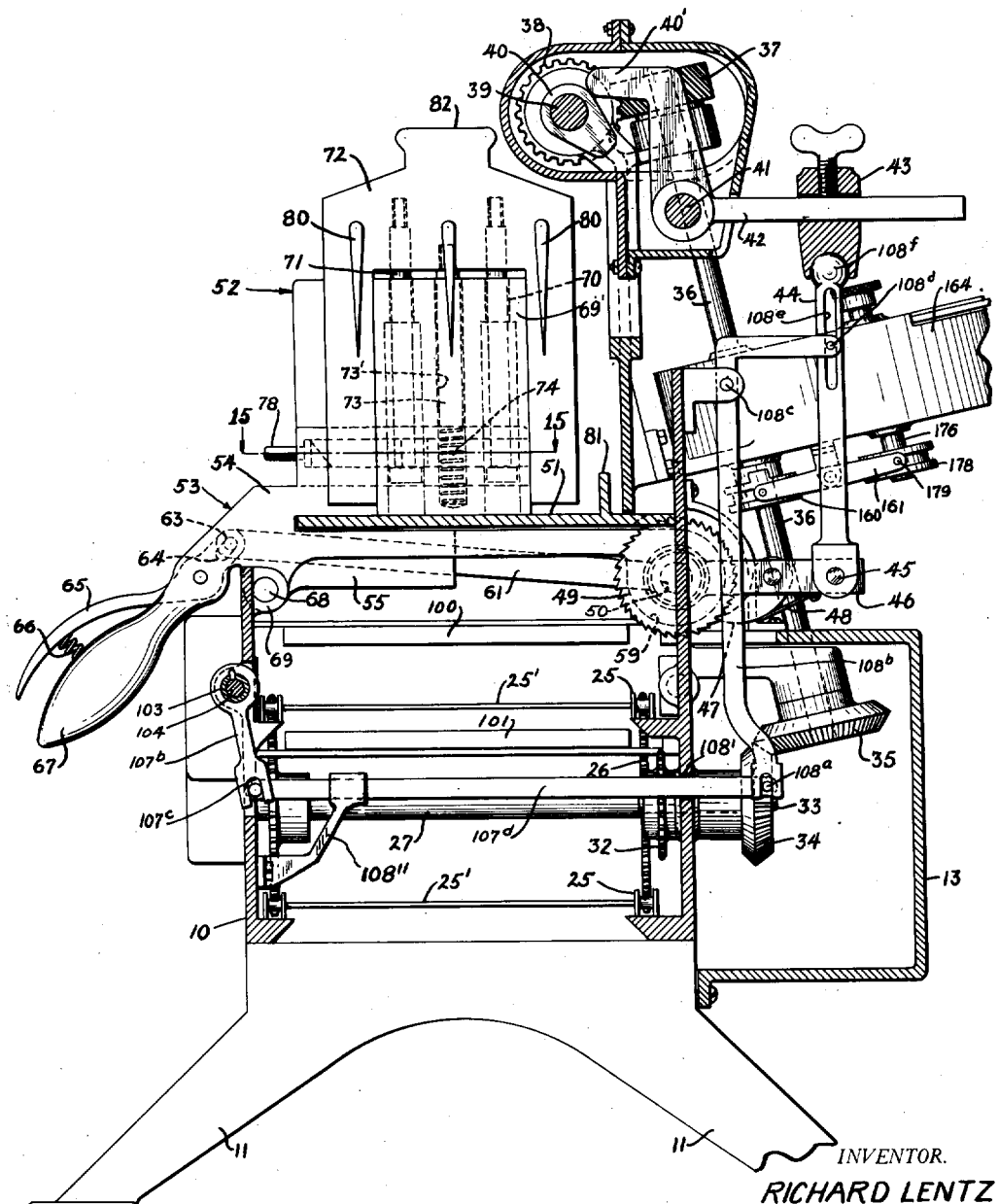

April 17, 1928.  R. LENTZ  1,666,335
AUTOMATIC SLICING, TOASTING, AND BUTTERING MACHINE
Filed June 29, 1925  7 Sheets-Sheet 6
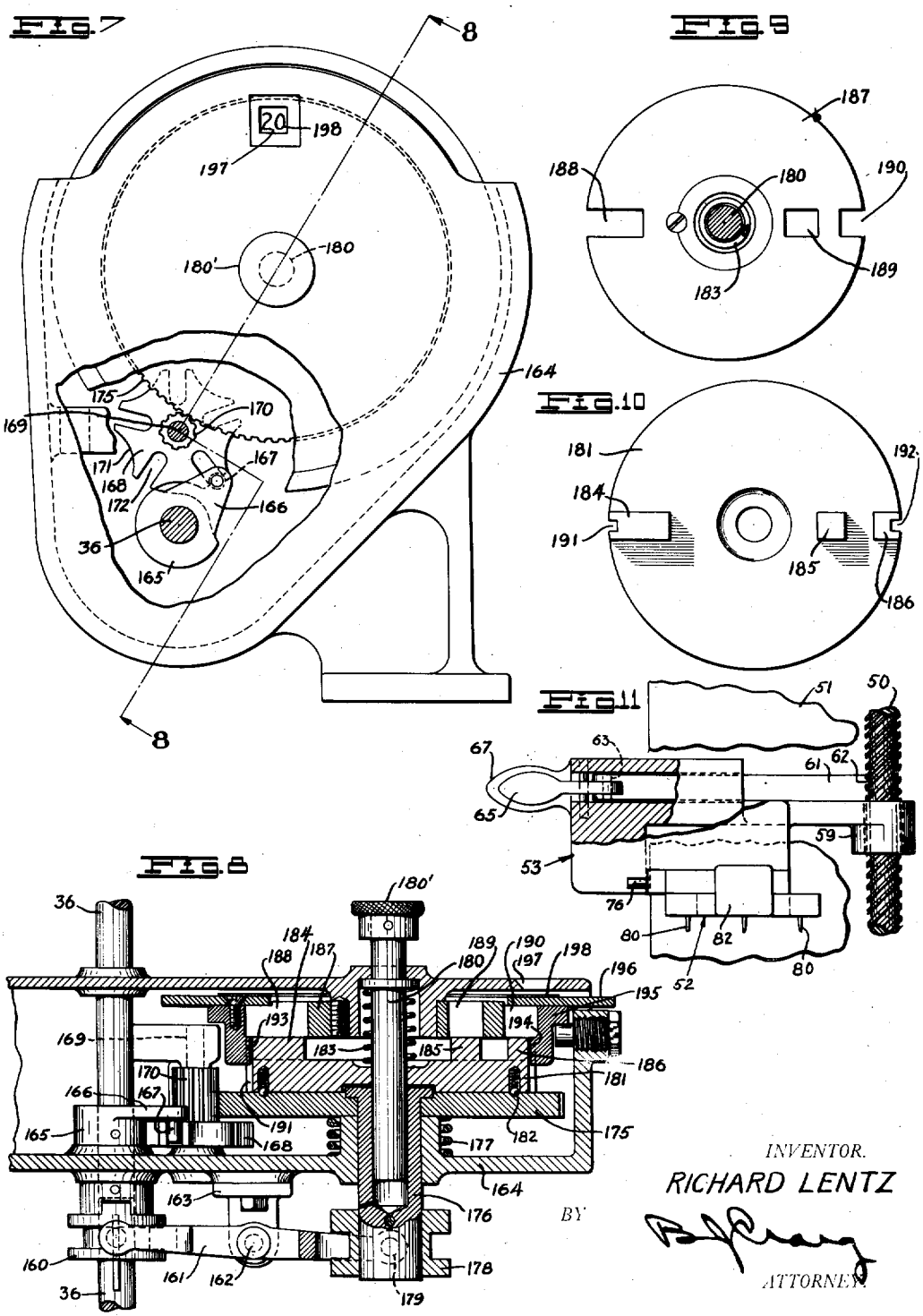
INVENTOR.
RICHARD LENTZ
BY
ATTORNEY

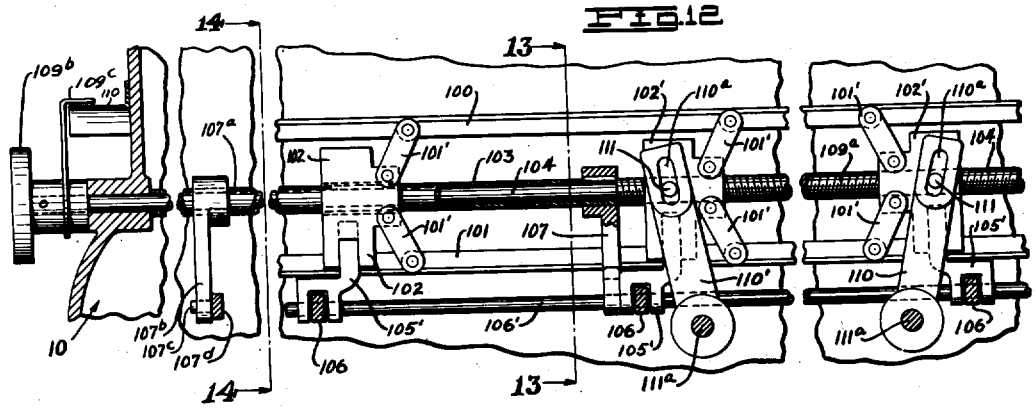
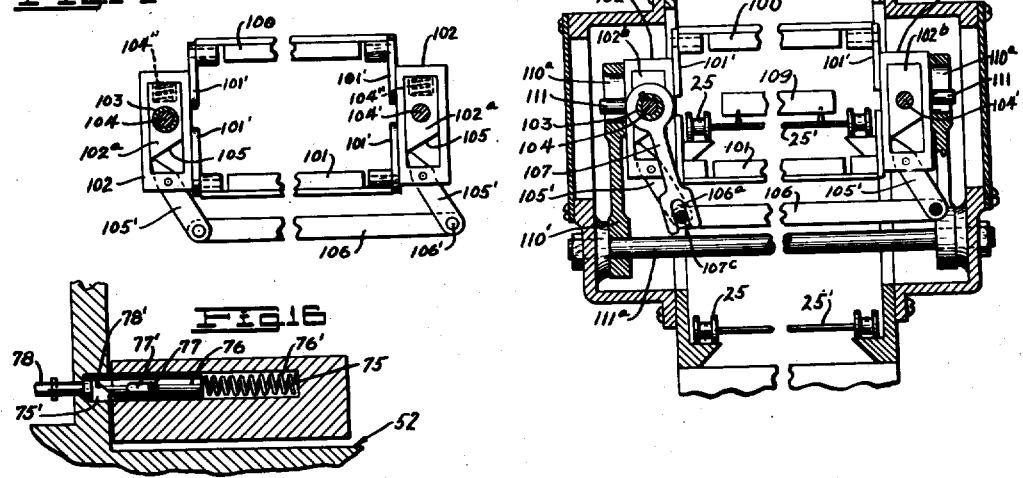
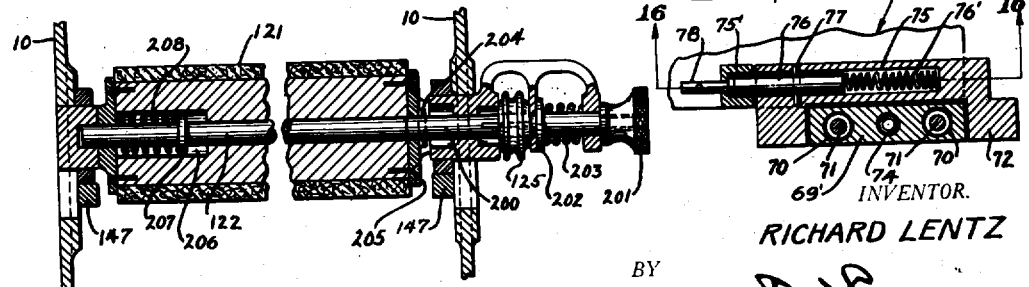

Patented Apr. 17, 1928.

1,666,335

UNITED STATES PATENT OFFICE.

RICHARD LENTZ, OF LOS ANGELES, CALIFORNIA.

AUTOMATIC SLICING, TOASTING, AND BUTTERING MACHINE.

Application filed June 29, 1925. Serial No. 40,194.

This invention relates to a machine for preparing bread for table use.

The general object of the invention is to provide an improved machine which is adapted for slicing bread and wherein the slicing means may be combined with means for toasting and buttering the bread.

One of the specific objects of the invention is to provide a combined bread slicing, toasting and buttering machine.

Another object of the invention is to provide an automatic toasting machine with means for causing the machine to deliver a predetermined number of slices of toast.

Another object of the invention is to provide a bread slicing machine wherein a continuously rotating knife is employed.

A further object of the invention is to provide an improved bread toasting mechanism.

Another object of the invention is to provide an improved buttering mechanism for applying butter to bread or toast.

Other objects of the invention will be apparent from the following description taken in connection with the accompanying drawings wherein, Fig. 1 is a side elevation of a machine embodying the features of my invention;

Fig. 2 is an end view of the machine;

Fig. 3 is a cross section taken on line 3—3, Fig. 4;

Fig. 4 is a transverse fragmentary section taken on line 4—4, Fig. 3;

Fig. 5 is a central, vertical, longitudinal section of the buttering or discharge end of the device;

Fig. 6 is a section on line 6—6, Fig. 4;

Fig. 7 is a detail, partly broken away, showing the automatic stop mechanism;

Fig. 8 is a section on line 8—8, Fig. 7 with the star-wheel of the Geneva movement shown in elevation;

Figs. 9 and 10 are top plan views of parts of the stop mechanism;

Fig. 11 is a plan view partly in section showing details of the feed control;

Fig. 12 is a fragmentary elevation partly in section showing details of the means for adjusting the heating elements;

Figs. 13 and 14 are cross sectional views taken on lines 13—13, and 14—14 respectively, Fig. 12;

Fig. 15 is a sectional detail taken on line 15—15, Fig. 6;

Fig. 16 is a sectional detail taken on line 16—16, Fig. 15; and,

Fig. 17 is a central sectional view through the buttering mechanism.

Referring to the drawing by reference characters, I have shown a supporting base at 10. This base includes a body portion having a plurality of supporting legs 11 thereon.

Mounted upon the base 10, I show a motor 12 which is supported adjacent to a gear case 13. The armature shaft 14 of the motor has a gear 15 thereon which drives a gear 16 arranged on a shaft 17. The shaft 17 has a gear 18 thereon which drives a gear 19 which is arranged to rotate coaxially with the shaft 14 but independently thereof. The gear 19 has a sprocket 20 thereon which carries a chain 21. This chain 21 passes over a sprocket 22 mounted on a shaft 23.

The shaft 23 is also provided with spaced sprockets 24 over which chains 25 pass. These chains 25 pass over other sprockets 26 arranged on a shaft 27 at the other end of the machine. The chains 25 are connected by bars 25' upon which the bread is conveyed, as will be later described.

The shaft 23 is also provided with a sprocket 30 which receives a chain 31 for driving another sprocket 32. This sprocket 32 is arranged on a shaft 33 and keyed to this shaft, I show a bevel gear 34 which meshes with a second bevel gear 35 keyed on a shaft 36. This shaft 36 is provided with a gear 37 which is adapted to drive a gear 38 mounted on a shaft 39.

Fixed on the shaft 39 is a cam 40 which is adapted to engage a bell crank lever 40' which is pivoted on a shaft 41 and which has an arm 42 thereon along which a member 43 is adjustably mounted. The member 43 has a link 44 which is pivotally mounted as at 45 upon a rock arm 46. The rock arm 46 has a pawl 47 thereon which is resiliently urged, by means of a spring 48, into engagement with a ratchet 49 arranged on the shaft 50.

The result of this construction is that when the motor 12 is operated it will cause the bevel gears 34 and 35 to be driven thus causing rotation of the shaft 39 and through the cam 40 will cause movement of the bell crank 40', thus rocking the bell crank and turning the shaft 50 periodically.

The shaft 50 extends longitudinally of the machine and is threaded substantially throughout its length. Above the shaft 50 I arrange a support or table 51 upon which the loaf of bread is adapted to be placed and along which it will be moved by a follower 52 which has a base 53 slidable on the table 51. The base 53 of the follower 52 constitutes an upper portion 54 and a lower portion 55 arranged beneath the table 51. The portion 55 is provided with a boss 59 which is apertured to receive the screw shaft 50 along which it may freely slide.

Mounted upon the lower portion 55 is a lever 61 which is shown as connected at one end by a pivot 63 for sliding movement in a slot 64 arranged on an operating handle 65 which is pivoted to the lower portion 55. The operating handle has a spring 66 thereon which egages a companion handle portion 67 which is fixed with regard to the part 53.

Mounted on the base 10 is an elongated rod 68 which is received in a bearing 69, arranged on the lower portion 55. It will thus be seen that the follower is supported on the table 51, the screw shaft 50, and the rod 68 for sliding movement. The inner end of the lever 61 is provided with teeth 62 constituting parts of threads which are adapted to engage the thread on the screw 50 so that as this screw turns the lever 61 will be moved along the screw and will carry the follower 53 with it.

The follower is provided with an upstanding projection 69' which has apertures 70 therein in which pins 71 mounted on an inverted U-shaped bread holding member 72 may slide. This member 72 is also provided with a pin 73 which fits an aperture 73' for sliding movement. The lower end of the pin engages a spring 74 which normally urges the holding member 72 upwardly. The projection 69' and the holding member 72 have holes 75 and 75' therein. In the hole 75, I arrange a locking bolt 76 which is normally urged outwardly by a spring 76'. A pin 77 works in a slot 77' to limit movement of the bolt 76. The hole 75' is shown as provided with a shouldered pin 78 the head of which is adapted to engage the beveled end 78' of the bolt 76. The construction is such that when the member 72 is pressed down the bolt 76 will snap into the hole 75'. To release the member 72 the pin 78 will be pressed causing this pin to engage the beveled end 78' and thereby move the pin 76 until its end is flush with the wall of the member 72 whereupon the spring 74 will push the member 72 upwardly. The member 72 is provided with bread engaging prongs 80.

To arrange a loaf of bread on the machine for operation, the handle 65 will first be grasped and will be operated causing the lever 61 to be retracted to free the inner end of this lever from engagement with the screw shaft 50. The follower 52 being thus freed to move along the table 51, it will be moved to the right in Fig. 1. When the follower is in the desired position the handle 65 will be released and the follower will be in position to be driven by the screw shaft 50.

The handle portion 82 on the member 72 will then be grasped and the pin 78 depressed so that the member 72 can be raised. After the member 72 is raised the bread will be positioned against the guide 81 and the handle 82 will then be depressed to cause the prongs 80 to enter the bread. The device is then ready for operation and upon the starting of the motor the arm 42 will rock thereby rocking the lever 46 and causing the screw 50 to intermittently feed the bread forward.

In order to slice the bread I show a rotating knife 85 mounted upon the shaft 39, and arranged at the outer end of the table. This knife is preferably curved as shown in Fig. 3, and has a scalloped or fluted cutting edge 86. The knife is so keyed to rotate with the shaft 39 that its back edge 87 (see Fig. 3) will clear the loaf of bread just prior to the time the bread is advanced. This enables the bread to advance while the knife which continues to rotate, is out of the path of movement of the bread.

The slices of bread cut by the knife will fall downwardly from the remainder of the loaf and will strike an inclined baffle 88 which will direct the bread to the cross bars 25' on the conveyor chains 25, previously described. The baffle 88 is pivoted on a shaft 89 and integral with this baffle is a front closure plate 90 which covers the front of the machine case 91. The closure plate 90 will be lowered to the dotted line position shown in Fig. 4, when the baffle 88 is raised to the dotted line position shown in this figure, so slices of bread may be directly discharged without delivering them to the chains 25.

It may be stated here that my invention is adapted for use as a bread slicer or for slicing other commodities and that it may be used without the toasting and buttering devices which I shall now proceed to describe.

In order to toast the slices of bread which are being advanced by the chains 25 I provide a pair of heating elements 100 and 101 which I will call the upper and lower elements respectively. These heating elements are adapted to be electrically operated and are provided with spaced links 101'. There are four sets of these links arranged on the upper and lower elements. The end sets of links at each side are pivotally connected to hollow supports 102 while the intermediate links are pivoted to hollow supports 102'.

Each of the supports 102 and 102' are mounted on blocks 102$^a$, and 102$^b$ respectively. The blocks are fitted within the hollow supports so that the supports may move vertically upon the blocks to thus adjust the position of the heating elements.

The block 102$^a$ at one end of one side is supported for free sliding movement on a tube 103 which is mounted loosely on the reduced portion of the rod 104. The other blocks on the last mentioned side are mounted on the enlarged portion of the rod 104. The blocks on the other side are mounted on a rod 104'.

Springs 104" normally urge the supports 102 upward on the blocks. The blocks have their lower faces 105 beveled and these beveled faces engage the ends of pivoted levers 105' which are shown as connected for uniform movement to links 106 by pivot members 106'. The pivot member 106' at one side is extended and is connected in a slot 106$^a$ of an arm 107 which is keyed to the tube 103. The end 107$^a$ of the tube 103 is provided with an arm 107$^b$ which through a pin 107$^c$ is adapted to be rocked by a link 107$^d$, on which a pin 108$^a$ engages within a slot in a bell crank 108$^b$ which is pivoted at 108$^c$ to the frame and which is held at one end in an aperture 108' and at the other end in a bracket 108" which is provided with a pin 108$^d$ which works in a slot 108$^e$ on the link 44. The link 44 is mounted on the adjustable member 43 by means of a ball and socket joint 108$^f$.

It will be remembered that when the member 43 is moved along the arm 42 that the travel of the rock arm 46 will be adjusted to control the thickness of the slices of bread. From the description of the heating element control just described, it will be apparent that, for example, upon movement of the member 43 outwardly to toast thicker slices, the resultant adjustment of the link 44 will shift the lower part of the bell crank 108$^b$ inwardly, thus shifting the link 108$^d$ inwardly which in turn will cause the lever 107$^b$ to turn the tube 103 clockwise thereby rocking the lever 107 and consequently rocking the levers 105' clockwise, to move the blocks 102$^a$ and 102$^b$ upwardly, thereby shifting the elements 100 and 101 vertically.

The construction and arrangement of parts is such that the axes of the rods 104 and 104' are in the same plane as the center of the slice of bread 109, shown in Fig. 13, and as the adjustable member 43 is shifted to change the thickness of the slices it will shift the elements 100 and 101 so that these elements remain equal distance from the slices of bread so that an even toasting action will be provided.

In order that the distance between the elements may be changed to cause a slow or rapid toasting action, I show the intermediate blocks 102' which are arranged upon the enlarged portion of the rod 104 as threaded. The rod adjacent these last mentioned blocks is threaded as at 109$^a$. By referring to Fig. 12, it will be noted that the threads on adjacent blocks extend in different directions and the result is that when the rod 104 is turned the intermediate pair of threaded blocks 102' will be moved toward or from each other and consequently through the links 101' the toasting elements 100 and 101 will be moved vertically toward and from each other.

In order to turn the rod 104 and consequently change the position of the elements, I provide the end of this rod with a knob 109$^b$ which is pinned to the end of the rod 104 and which is provided with an index 109$^c$ which moves over a scale 110.

When the knob 109$^b$ is turned the rod 103 will be turned and the threaded portion 109$^a$ engaging the threaded blocks will cause relative movement between the rod and the blocks.

The heating elements are prevented from being moved by the toggle arms, by arms 110' which have slots 110$^a$ fitting over pins 111 on the blocks 102'. The arms 110' are shown as pivoted on shafts 111$^a$ (see Fig. 13).

After the toasted bread passes from between the heating elements 100 and 101 it may be discharged down a chute 120 without being first buttered. I prefer, however, to butter the toast as soon as it leaves the proximity of the heating elements 100 and 101. To accomplish this buttering operation, I mount a buttering roll 121 on a shaft 122. This buttering roll is adapted to be driven by a belt 123 from a pulley 124 arranged on the shaft 27 and which engages a pulley 125 mounted on the shaft 122.

A butter receptacle 126 is disposed above the buttering roll 125 and is provided with an aperture 127 through which the butter drops. The receptacle 126 is surrounded by electrically operated heating coils 128 to keep the butter in a plastic or fluid condition. The receptacle is provided with transversely extending rods 129 and adjacent these rods I pivot a vertically extending member 130 which has offset portions 131 extending between the rods 129. The member 130 is mounted on a pivot 132 which has a member 133 secured thereon. This member 133 is notched at its upper end 134 to receive a tongue 135 fixed on a shaft 136. The shaft 136 has a crank 137 thereon to which a pitman 138 mounted on a disc 139 is connected. The disc 139 is arranged on the shaft 27 so that as this shaft rotates the pitman will be rocked thus moving the member 133 backward and forward to keep the butter in motion.

Beneath the aperture 127 I arrange a closure 140 which has a link 141 pivoted to a bell crank 142 which is mounted on a shaft 143. The bell crank 142 includes an arm 144 having a bread engaging roller 145 thereon and the construction is such that when the slice of bread 109 engages the roller 145 it will lift this roller and will cause the closure 140 to open the aperture 127 as shown in Fig. 5.

The buttering roller 125 is preferably made of soft porous felt-like material and in order to adjust the position of this roller with respect to the bread 146 I mount the roller upon an arm 147 which is pivoted on a shaft 148. The arm 147 has a projection 148' thereon which is adapted to engage an eccentric disc 149 mounted on a shaft 150. The shaft 150 is provided with a handle 151 whereby it can be turned. As the eccentricity of the member 149 is changed it will be apparent that the normal distance of the roller 125 from the top of the chains 25 will be adjusted.

It will be understood that in operating by device, I may slice the bread and deliver it as described. I may also slice the bread, toast it, butter it and deliver it, and from the foregoing description it will also be apparent that by leaving the heating elements 100 and 101 which are preferably electrically operated without current, the sliced bread will pass through the machine and will be buttered without being toasted.

If desired, the supply of butter may be omitted so that the bread may be sliced and toasted without buttering it. Instead of placing butter in the receptacle 126 I may place ground meat, jams, etc., and place them on the sliced bread.

The use to which my invention is particularly adapted, namely, for hotel and restaurant trade, makes it desirable that the machine operate without personal attention and for this reason, I have provided means which I will now proceed to describe, whereby the operator may set the machine to produce a number of pieces of sliced bread after which the machine will automatically stop its operation.

To bring about the result just described, I make the shaft 36 in two parts and connect these parts by a sliding clutch 160. This clutch is provided with an operating lever 161 which is pivotally mounted on a shaft 162 secured upon a bracket 163 mounted on the outside of a case 164.

Within the case 164, I arrange mechanism for automatically actuating the clutch 160 after a predetermined number of slices of bread have been made. Mounted upon the shaft 36, I show a collar 165 which has a projecting portion 166 thereon from which a pin 167 protrudes. This pin 167 is adapted to engage the star wheel 168 of a Geneva-stop mechanism. The star wheel 168 is keyed on a shaft 169 upon which is also keyed a spur gear 170.

The arrangement of parts is such that the outer periphery of the collar 165 engages the arcuate faces 171 of the star wheel 168 during a portion of a revolution of the shaft 36 and during the remainder of the revolution of the shaft the pin 167 enters the slots 172 to cause a partial rotation of the shaft 169 and consequently cause a partial rotation of the gear 170.

The gear 170 meshes with a gear 175 which is mounted on a bushing 176 which is slidable within the case 164. A spring 177 normally urges the gear 175 upwardly (in Fig. 8) and as this gear 175 goes upwardly its teeth will slide along the teeth of the gear 170. The bushing 176 is provided with an end member 178 which has a pivot 179 to which the end of the lever 161 is pivoted.

From the foregoing description it will be apparent that when the gear 175 and the bushing 176 are moved upwardly by the springs 177 the clutch 160 will disengage the two sections of the shaft 36.

In order to hold the clutch in the engaged position I mount a shaft 180 within the case 164. This shaft has a handle 180' thereon and one end portion fitted within the bushing 176 for free turning movement and upon the shaft I arrange a free disc 181 which has a plurality of spring pressed locking balls 182 which engage in apertures in the face of the gear 175. A spring 183 normally forces the disc 181 against the gear 175. This spring 183 is weaker than the spring 177 for a purpose to be later described.

The disc 181 is indicated as provided with bosses 184, 185, and 186 on the upper face thereof. Above the disc 181 I fix a disc 187 which has apertures 188, 189, and 190 corresponding to the bosses 184, 185, and 186. The disc 181 has peripheral notches 191 and 192 thereon which fit projections 193 and 194 on a collar 195 which has an operating portion 196 which projects beyond the case 164. The case has an aperture 197 therein and the collar 195 has a scale 198 thereon.

To set the device to cause a certain number of slices of bread to be cut the handle 180' is depressed. This action will increase the tension in the spring 183 and will cause the disc 181 to move to the position shown in Fig. 8, with the projections 193 and 194 sliding in the slots 191 and 192. While the handle 180' is held depressed, the operating portion 196 will be grasped and turned until the correct number on the scale 198 appears in the aperture 197. When the correct reading is secured the handle 180' will be released. The bosses 184, 185, and 186 will then engage the lower face of the disc 187 so that the spring 177 cannot act to release the clutch.

As the gear 170 is slowly rotated the disc 181 will be slowly turned until finally the bosses 184, and 185 and 186 register with the apertures 188, 189, and 190 at which time the spring 177 will slide the gear 175 along the gear 170 and will cause the bushing 176 to rock the lever 161 and consequently disengage the clutch.

In order that the buttering roll 121 may be readily removed, I make the shaft 122 a two part one. The part 200 shown at the right in Fig. 17 and on which the pulley 125 is keyed for sliding movement is provided with an operating knob 201 and with a collar 202 fixed thereon. A spring 203 normally engages the collar 202 and urges this collar and the part 200 to the left in Fig. 17. A pin 204 passes through the part 200 and engages a pocket in an end plate 205 of the buttering roll so that the pulley 125 will drive the roll 121.

The other end of the roll 121 is provided with a recess 206 through which the shaft 122 extends, the shaft has a collar 207 fixed thereon which is engaged with a spring 208.

To insert a new buttering roll the knob 201 is pulled moving the part 200 to the right in Fig. 17. This allows the spring 208 to push the shaft 122 out of its bearing so that the roll can be removed. A new roll will then be inserted and the knob 201 released to secure the roll in place.

Having thus described my invention, I claim:

1. In a device of the class described, a frame, a support for the bread, means to slice said bread, adjusting means to adjust the thickness of the slices, a toasting device including spaced elements, means to feed the sliced bread between said elements, said means including a conveyor and means connected to said adjusting means to move one element towards and from the conveyor as the adjusting means is operated to cut a thicker or a thinner slice.

2. In a toasting device, a pair of spaced elements, a conveyor for conveying bread between said elements, means to hold said elements in spaced apart relation and single means to shift said elements relative to the conveyor while held in spaced apart relation.

3. In a toaster, a pair of spaced elements, means to hold an article between said elements, shiftable means for moving said elements as a unit and other means for moving said elements toward and from each other.

4. In a toasting device, a pair of spaced elements, a conveyor for conveying bread between said elements, means to hold said elements in spaced apart relation, means to shift said elements relative to the conveyor while held in spaced apart relation, and means to move said elements toward and from each other.

5. In a bread slicing mechanism, a support for bread, means to slice said bread, means to adjust the thickness of each slice, bread advancing means for moving the sliced bread from the slicing means, a heating element spaced from the bread moving means, means to adjust the distance between the moving means and the element, and a single means to control the thickness of the slice and the distance of the element from the bread moving means.

6. In a device of the class described, a frame, a support for bread thereon, means to slice said bread, a pair of heating elements, means to adjustably space said elements a predetermined distance apart, means to feed the sliced bread between said elements, means to govern the thickness of each slice and means whereby when the thickness of the slice is increased or diminished the elements will be separated or brought together.

7. In a bread toasting mechanism, a conveyor for bread, a pair of heating elements, means to hold said heating elements one above and one spaced below said conveyor, means to advance the bread between said heating elements, means to change the distance between said elements, and other means operable independently of the first mentioned means for centering the elements relative to the bread.

8. In a bread toasting mechanism, an endless conveyor having an upper and a lower reach, means to drive said conveyor to advance said upper reach, a pair of heating elements, supporting means to hold said heating elements spaced one above and one below said upper reach, means to change the distance between said elements, and other means for moving the supporting means to shift the elements in the same direction.

9. In a bread toasting mechanism, a support for bread, means to advance the bread on said support step by step, means to slice the bread, a pair of heating elements, means to hold said heating elements a spaced distance apart, means to feed the sliced bread between said heating elements, means to adjust the thickness of each slice of bread, means to shift the elements to keep them an equal distance from the top and bottom of the bread and single means for controlling the two last mentioned means.

In testimony whereof, I hereunto affix my signature.

RICHARD LENTZ.